United States Patent
Shaffer et al.

(10) Patent No.: US 6,384,853 B1
(45) Date of Patent: May 7, 2002

(54) APPARATUS AND METHOD FOR PREVENTING SCREEN SAVERS FROM SHUTTING DOWN TOL CLIENTS

(75) Inventors: Shmuel Shaffer, Palo Alto; William J. Beyda, Cupertino, both of CA (US)

(73) Assignee: Siemens Information and Communcation Networks, Inc., Boca Raton, FL (US)

( * ) Notice: Subject to any disclaimer, the term of this patent is extended or adjusted under 35 U.S.C. 154(b) by 0 days.

(21) Appl. No.: 09/333,790

(22) Filed: Jun. 15, 1999

(51) Int. Cl.[7] .................................................. G06F 3/00
(52) U.S. Cl. ....................... 345/867; 345/808; 345/700; 713/300; 713/320
(58) Field of Search ................................ 345/867, 700, 345/808, 866; 713/300, 310, 320, 321, 323

(56) References Cited

U.S. PATENT DOCUMENTS

| 5,237,692 A | 8/1993 | Raasch et al. ............... 710/267 |
| 5,610,601 A | 3/1997 | Lahti et al. .................... 341/22 |
| 5,621,401 A | 4/1997 | Jeon et al. ..................... 341/22 |
| 5,642,185 A * | 6/1997 | Altrieth et al. .............. 345/212 |
| 6,076,169 A * | 6/2000 | Lee ............................. 713/320 |
| 6,108,028 A * | 8/2000 | Skarbo et al. .............. 345/753 |
| 6,145,083 A * | 11/2000 | Shaffer et al. .............. 455/410 |
| 6,205,318 B1 * | 3/2001 | Schindler et al. ........... 345/212 |
| 6,246,397 B1 * | 6/2001 | Vossler ........................ 345/204 |

OTHER PUBLICATIONS

U.S. application No. 09/162,351, Shaffer et al., filed Sep. 28, 1998.

* cited by examiner

*Primary Examiner*—Raymond J. Bayerl
*Assistant Examiner*—Sy D. Luu

(57) ABSTRACT

A telephony-over-LAN client is provided which disables a screen saver during active calls by generating a software interrupt indicative of either false keyboard interrupts or false mouse movements. The ToL client is configured to periodically activate such an interrupt during an active call immediately prior to the end of the timeout period of the screen saver. Alternatively, or in addition to the above-mentioned false keyboard interrupts or mouse movements, a false write to the hard drive might be provided.

28 Claims, 9 Drawing Sheets

APPARATUS AND METHOD FOR PREVENTING SCREEN SAVERS FROM SHUTTING DOWN TOL CLIENTS

BACKGROUND OF THE INVENTION

1. Field of the Invention

The present invention relates to telephony-over-local area network (ToL) systems and, particularly, to an improved ToL user interface.

2. Description of the Related Art

Telephony-over-LAN (ToL) client users often speak for many minutes without touching their keyboards or mice. This can cause screen savers to activate, thereby blanking the screen. If the user does not know the password associated with the screen saver, the ToL call cannot be disconnected and ToL features cannot be utilized. Moreover, certain screen savers also include energy saving devices, wherein a low power suspend mode is entered if no activity is detected for a predetermined period. This can cause the ToL call to be disconnected.

Screen saver utilities are known in which the screen saver is temporarily disabled in response to an affirmative user command. For example, a user may click on a Screen Saver Disable icon to prevent the screen saver from launching during the current session upon expiration of the timeout set for it. Upon the next login, the screen saver is restored. However, such a system is disadvantageous in that the screen saver is completely disabled for the duration of the session, even after the ToL call is completed.

In another screen saver utility, the screen saver may be disabled by moving the cursor to a hot spot icon. The screen saver is re-enabled when the cursor is moved. However, with this system, an unintended jostling of the mouse or cursor pointing device can cause activation of the screen saver and loss of the ToL call.

SUMMARY OF THE INVENTION

These and other drawbacks in the prior art are overcome in large part by a system and method according to the present invention. A telephony-over-LAN client is provided which disables a screen saver during active calls by generating a software interrupt indicative of either false keyboard interrupts or false mouse movements. The ToL client is configured to periodically activate such an interrupt during an active call immediately prior to the end of the timeout period of the screen saver. Alternatively, or in addition to the above-mentioned false keyboard interrupts or mouse movements, a false write to the hard drive might be provided.

According to one embodiment of the invention, the screen saver disabler is configured to activate in response to a call setup command. When a call setup command is detected, the screen saver disabler activates and reads the timeout setting of the screen saver. Then, so long as no call termination commands are detected, the screen saver disabler issues keyboard interrupts, mouse movements, disk drive accesses or other predetermined functions to "trick" the screen saver into thinking there is recognizable activity. When the call termination command is detected, the screen saver disabler deactivates.

BRIEF DESCRIPTION OF THE DRAWINGS

A better understanding of the invention is obtained when the following detailed description is considered in conjunction with the following drawings in which.

DETAILED DESCRIPTION OF THE INVENTION

Figure 1:
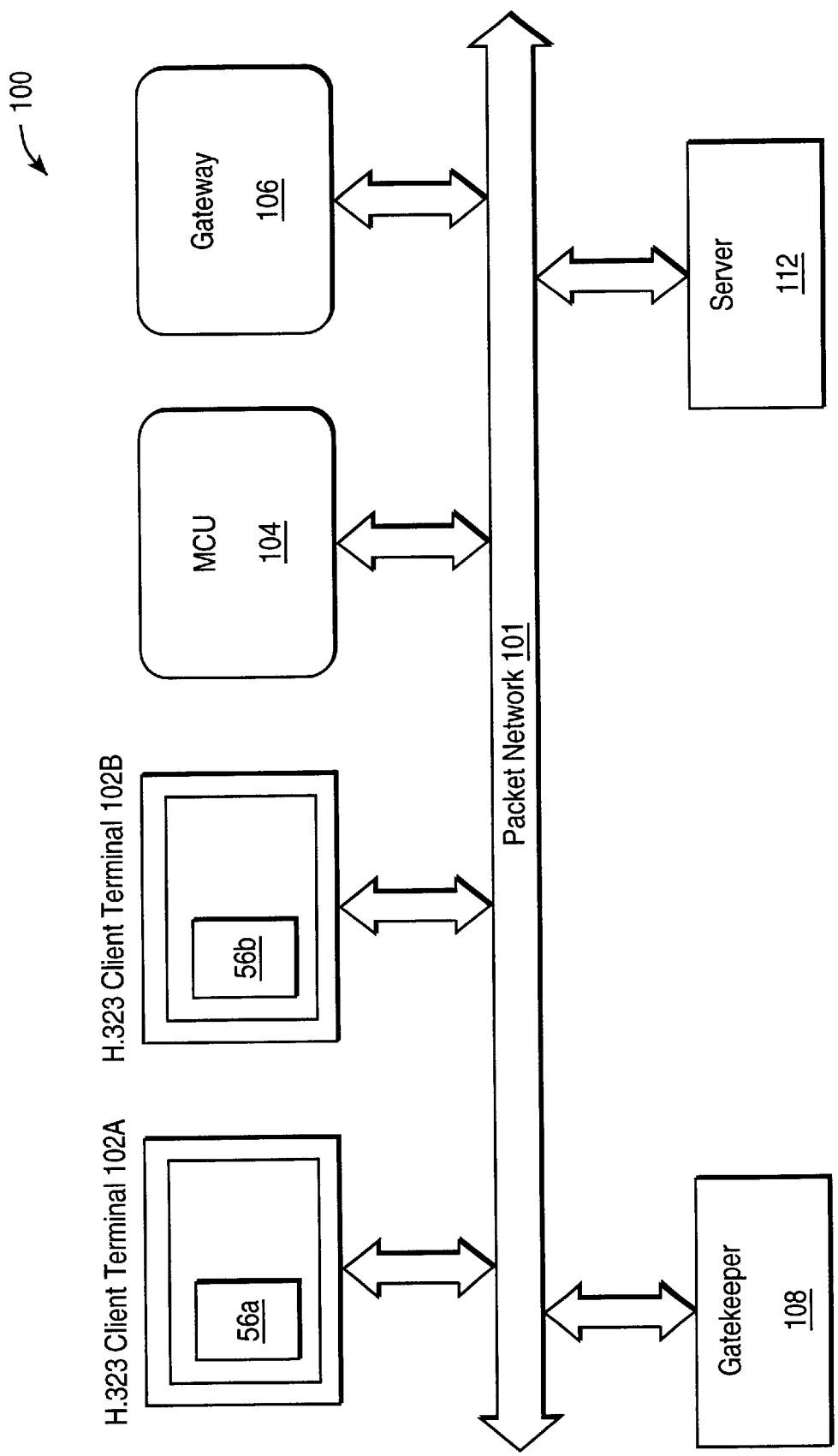
FIG. 1 is a diagram of an exemplary ToL system according to an embodiment of the invention.

Turning now to the drawings, and with particular attention to FIG. 1, a diagram illustrating an exemplary telephony-over-LAN system 100 according to an embodiment of the present invention is shown. An exemplary ToL system is an H.323 system, such as the Siemens HiNet™ RC 3000 system available from Siemens.

The telecommunications system 100 includes a local area network (LAN) or packet network 101. Coupled to the LAN 101 may be a variety of H.323 terminals 102a, 102b, a multi-point control unit (MCU) 104, an H.323 gateway 106, an H.323 gatekeeper 108, a LAN server 112 and a plurality of other devices such as personal computers (not shown). The H.323 terminals 102a, 102b are in compliance with the H.323 Recommendation. Thus, the H.323 terminals 102a, 102b support H.245 control signaling for negotiation of media channel usage, Q.931 (H.225.0) for call signaling and call setup, H.225.0 Registration, Admission, and Status (RAS), and RTP/RTCP for sequencing audio and video packets. The H.323 terminals 102a, 102b may further implement audio and video codecs, T.120 data conferencing protocols and MCU capabilities. Further details concerning the H.323 Recommendation may be obtained from the International Telecommunications Union; the H.323 Recommendation is hereby incorporated by reference in its entirety as if fully set forth herein.

Further, the H.323 terminals 102a, 102b include screen saver disabler units 56a, 56b according to the present invention. The screen saver disabler units 56a, 56b function to detect call setup and call termination commands and disable the terminal's screen saver during the duration of a ToL call, as will be explained in greater detail below. The screen saver disabler units may also function to disable power saver units, such as in the power management system of Windows 98.

Figure 2:
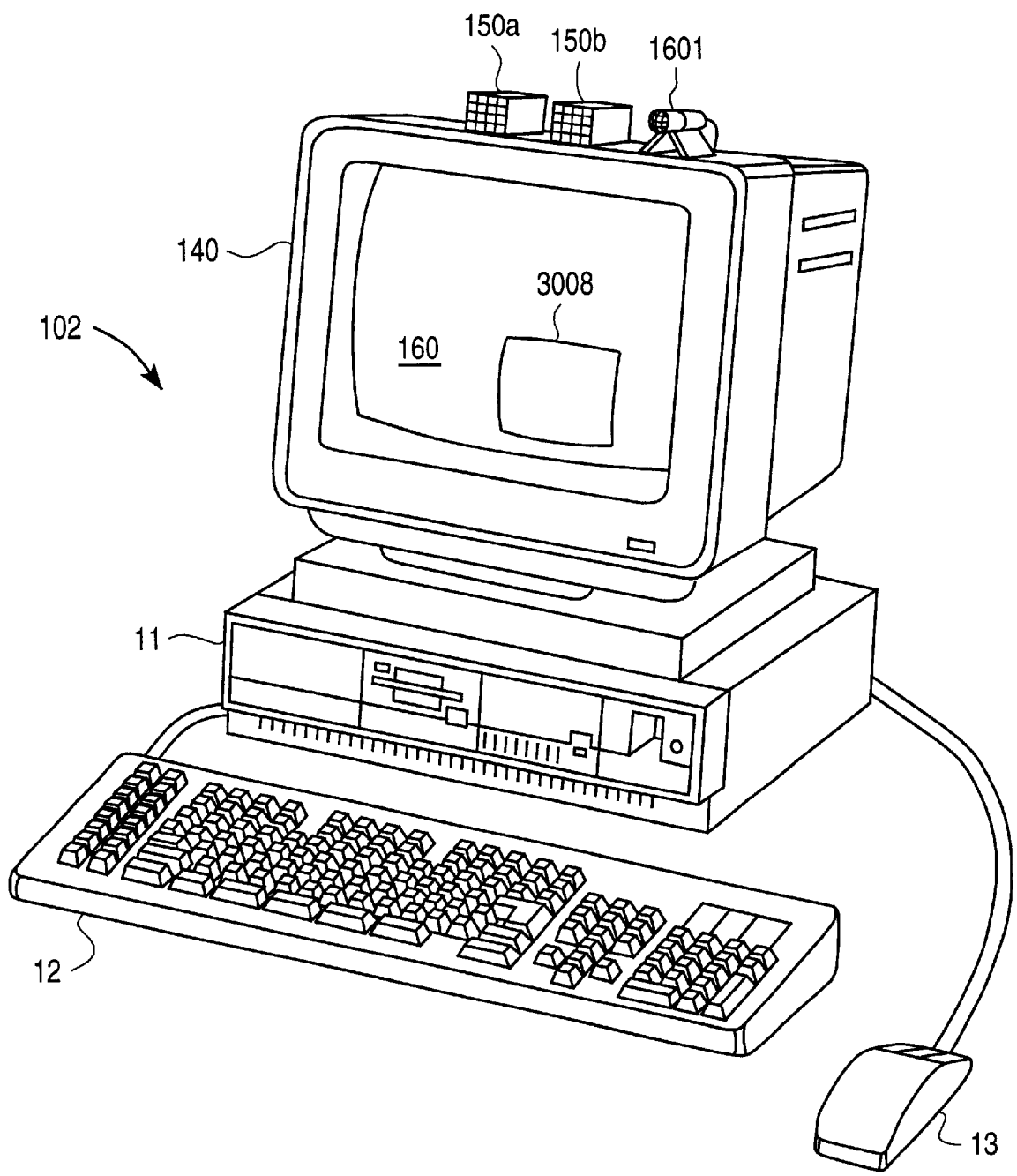
FIG. 2 is a diagram of an exemplary ToL client terminal according to an embodiment of the invention.

An exemplary ToL client terminal 102 is shown in FIG. 2. The ToL client terminal 102 may be embodied as a personal computer, including a system unit 11, a keyboard 12, a mouse 13, and a display 140. Also shown are one or more speakers 150a, 150b, and a microphone 1601. The screen 160 of the display device 14 is used to present a graphical user interface (GUI) and particularly, a ToL client window 3008. The graphical user interface supported by the operating system allows the user to employ a point-and-click method of input, i.e., by moving the mouse pointer or cursor (not shown) to an icon representing a data object at a particular location on the screen 160 and pressing one or more of the mouse buttons to perform a user command or selection. The GUI may be any of the Windows GUIs available from Microsoft Corporation or the Macintosh OS, available from Apple Computer. The ToL client terminal 102 supports a screen saver (not shown) as well as a screen saver disabler and/or a power save disabler according to the present invention.

Figure 3:
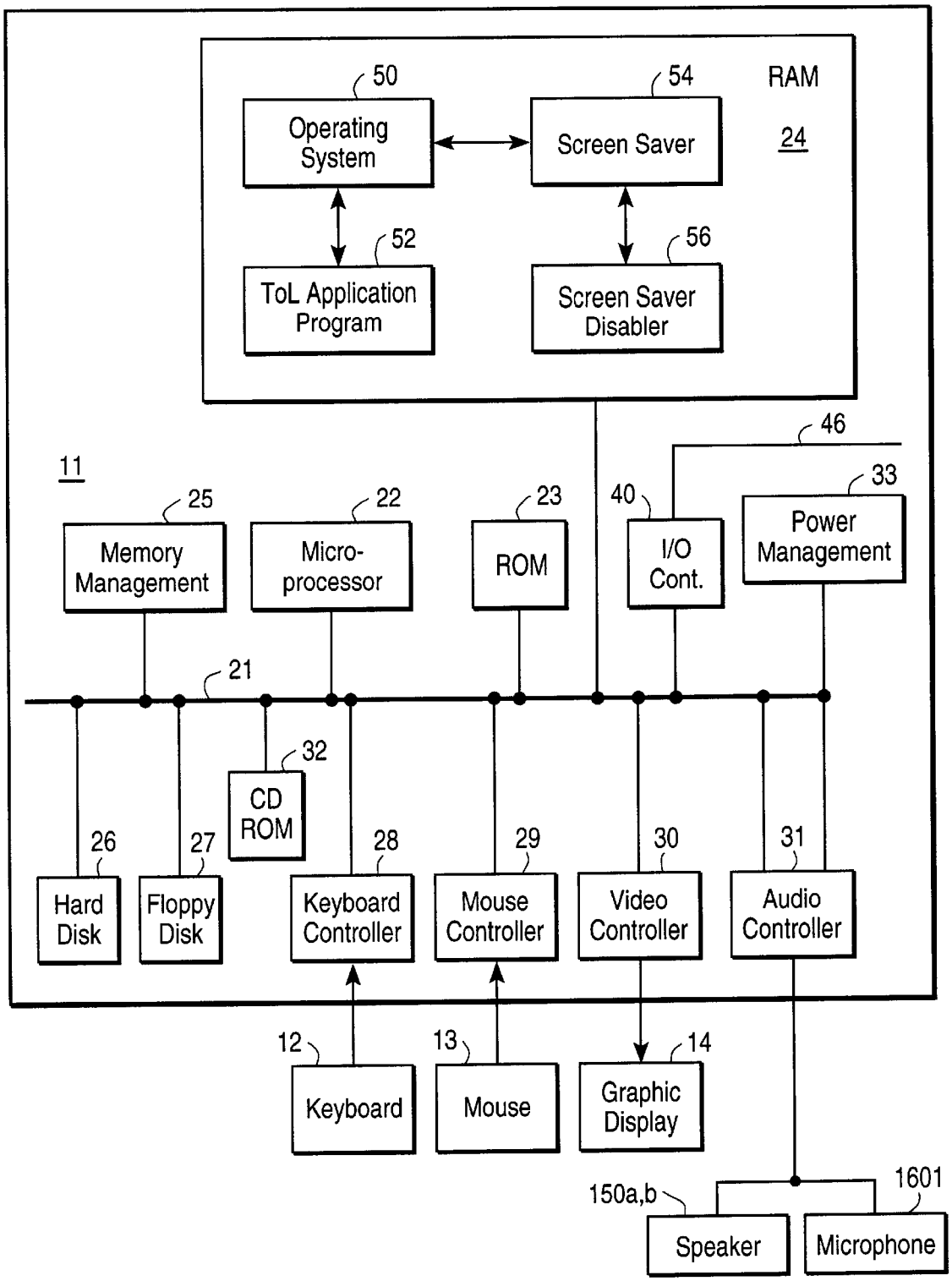
FIG. 3 is a block diagram illustrating the ToL client terminal of FIG. 2.

FIG. 3 shows a block diagram of the components of the personal computer or ToL client terminal shown in FIG. 2. The system unit 11 includes a system bus or a plurality of system buses 21 to which various components are coupled and by which communication between the various components is accomplished. The microprocessor 22 is coupled to the system bus 21 and is supported by the read only memory (ROM) 23 and the random access memory (RAM) 24 also connected to the system bus 21. The microprocessor 22 may be embodied as any of a variety of microprocessors, including Intel x86, Pentium or Pentium II or compatible processors.

The ROM 23 contains among other code the basic input output system (BIOS) which controls basic hardware operations such as the interaction of the disk drives and the keyboard. The RAM 24 is the main memory into which the operating system and applications programs are loaded. The memory management chip 25 is connected to the system bus 21 and controls direct memory access operations including passing data between the RAM 24 and hard disk drive 26 and floppy disk drive 27. A CD ROM drive (or DVD or other optical drive) 32 may also be coupled to the system bus 21 and is used to store a large amount of data, such as a multimedia program or a large database.

Also connected to the system bus 21 are various I/O controllers: the keyboard controller 28, the mouse controller 29, the video controller 30, and the audio controller 31. The keyboard controller 28 provides the hardware interface for the keyboard 12; the mouse controller 29 provides the hardware interface for the mouse 13; the video controller 30 is the hardware interface for the video display 14; and the audio controller 31 is the hardware interface for the speakers 15 and microphone 16. The speakers 150a, b and the microphone 1601 allow for audio communication during ToL operation. In operation, keyboard strokes are detected by the keyboard controller 28 and corresponding signals are transmitted to the microprocessor 22; similarly, mouse movements and button clicks are detected by the mouse controller and provided to the microprocessor 22. Typically, the keyboard controller 28 and the mouse controller 29 assert interrupts at the microprocessor 22. In response, the microprocessor 22 executes a corresponding interrupt routine, as is known. Additionally, an interrupt controller (not shown) may be provided to arbitrate among interrupt requests. As will be explained in greater detail below, the screen saver disabler 56 according to the present invention monitors call setup and call termination commands and enables or disables the screen saver in response thereto. In addition, a known power management system 33 may be provided which causes the computer to enter a power down mode if no activity is detected over a predetermined period. The screen saver disabler 54 may also function to disable the power management system's power down function during a ToL call, as will be explained in greater details below.

An I/O controller or network interface 40 enables communication over a network 46, such as a packet network. More particularly, the I/O controller 40 may be an H.323 Recommendation interface, to allow for telephony or multimedia communications via the packet switched network 101, as will be explained in greater detail below.

One embodiment of the present invention is as a set of instructions in a code module resident in the RAM 24. Until required by the computer system, the set of instructions may be stored in another computer memory, such as the hard disk 26, on an optical disk for use in the CD ROM drive 32, or a floppy disk for use in the floppy disk drive 27. As shown in the figure, the operating system 50, the ToL client application 52, the screen saver 54, and the screen saver disabler 56 are resident in the RAM 24.

As is known, the operating system 50 functions to generate a graphical user interface on the display 14. The ToL application program 52 performs ToL functionality, including generation of a ToL client window 3008 (FIG. 2)in the GUI. The screen saver 54 is a standard screen saver, configured to activate after a predetermined set time. The screen saver disabler 56 is configured to monitor the ToL Application Program 52 and detect one or more predetermined start conditions and one or more predetermined end conditions, and disable the screen saver 54 and/or the power management system 33's power down mode in response thereto by generating one or more functions which cause a screen saver timer to reset or deactivate. Such start conditions may include, for example, detection of the start up of the ToL Application program, or detection of a call setup command being issued via the I/O controller 40. Predetermined end conditions may include the closing of the ToL Application program 52 or the detection of a call termination command being issued by or received from the I/O controller 40.

Figure 4:
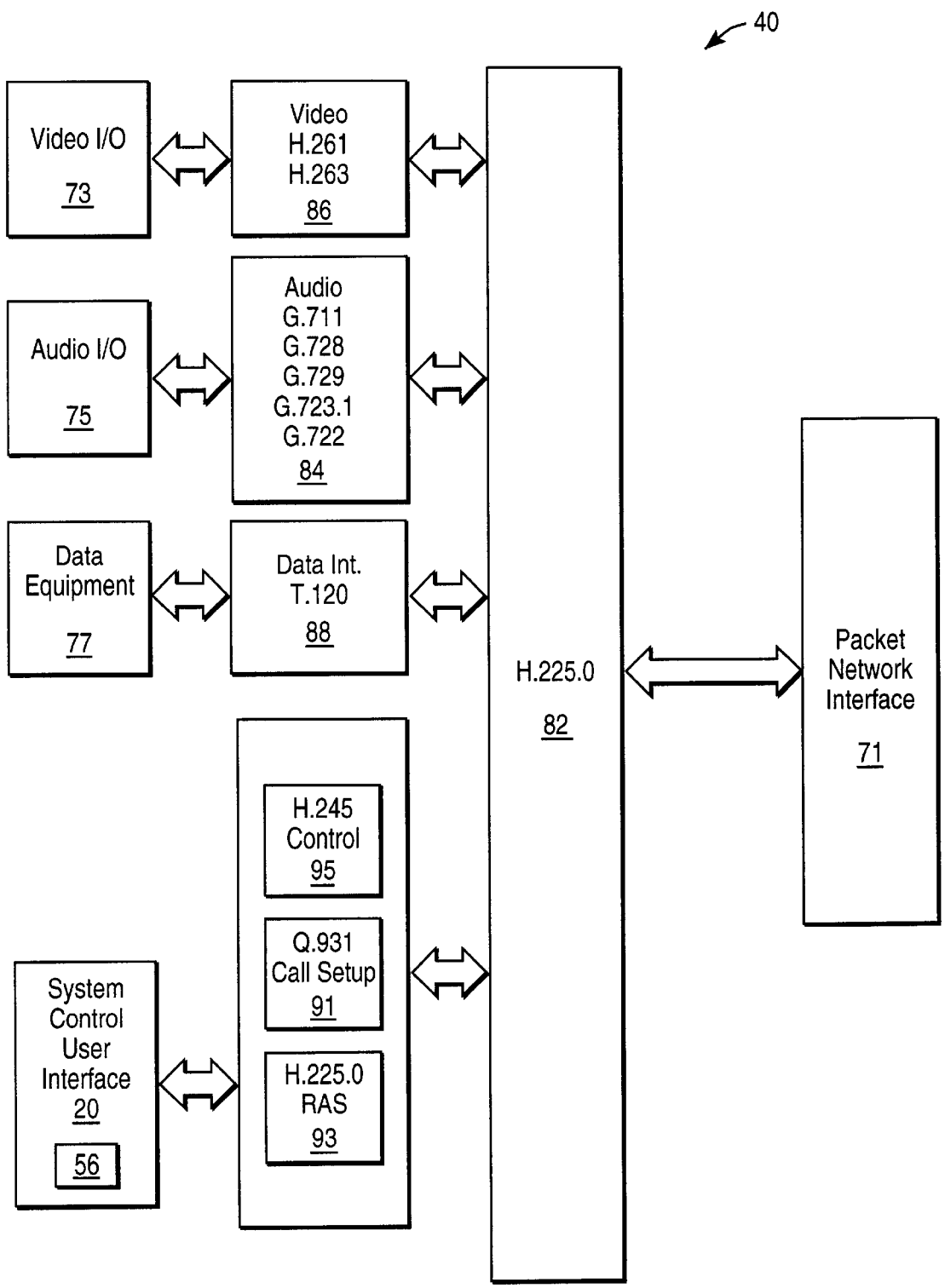
FIG. 4 is a block diagram of an exemplary ToL interface according to an embodiment of the invention.

In accordance with a specific embodiment, FIG. 4 illustrates a logical diagram of an H.323 interface 40 to the LAN 101. The H.323 interface includes a packet network interface 71 that is coupled to the network terminal or ToL client terminal 102. As will be discussed in greater detail below, the network terminal 102 utilizes the ITU-T H.323 Recommendation protocol. The network interface 71 couples the network terminal 102 to the LAN 101. H.323 terminals/devices and equipment carry real-time voice, video and/or data. It should be noted that H.323 is an umbrella recommendation that provides recommendations for multimedia communications, including telephony-over-LAN communications. The network can include packetswitched Transmission Control Protocol/Internet Protocol (TCP/IP) and Internet Packet Exchange (IPX) over Ethernet, Fast Ethernet, gigabit Ethernet, and Token Ring networks.

As noted above, the H.323 client terminal 102 includes a video input/output (I/O) interface 73, an audio I/O interface 75, a data equipment interface 77 (such as the CD ROM or disk drives), and a system control user interface (SCUI) 80 (such as the microprocessor 22 running the ToL Application program). The network terminal 102 further includes an H.225.0 layer 82, an audio coder/decoder (codec) 84 and may include, a video codec 86, and a T.120 data interface layer 88. The audio I/O interface or card 75, which may be part of the standard H.323 device, connects to the audio codec 84, such as a G.711 codec, for encoding and decoding audio signals. The audio codec 84 coupled to the H.225.0 layer 82 encodes audio signals for transmission and decodes the received signals. Although the G.711 codec is the mandatory audio codec for an H.323 terminal, other audio codecs, such as G.728, G.729, G.723.1, G.722, and MPEG1 audio may also be used for encoding and decoding speech. G.723.1 is a preferred codec because of its reasonably low bit rate, which enables preservation of link bandwidth, particularly in slower speed network connections.

The video I/O interface or card 73, which may be part of the standard H.323 device, connects to a video codec 86, such as an H.261 codec for encoding and decoding video signals. The video codec 86 encodes video signals for transmission and decodes the received signals. H.261 is the mandatory codec for H.323 terminals that support video, though other codecs such as H.263 may be supported.

The system control user interface (SCUI) 80 provides signaling and flow control for proper operation of the H.323 terminal 102. The SCUI 80 may be embodied as a program executable by the microprocessor 22 or a separate processor capable of communicating with the microprocessor 22. In particular, call signaling and control are handled by the SCUI 80. a screen saver disabler 56 according to one embodiment of the present invention may form part of the SCUI 80, as will be discussed in greater detail below.

The control layer 111 includes a Q.931 layer 91, an H.225.0 RAS layer 93 and an H.245 layer 95. Thus, the SCUI 80 interfaces to the H.245 layer 95 which is the media control protocol that allows capability exchange, opening and closing of logical channels, mode preference requests, flow control messages, and other miscellaneous commands and indications. The SCUI 80 also interfaces to the Q.931 protocol 91 which defines the setup, teardown, and control of H.323 communication sessions. The SCUI 80 further interfaces to the H.225.0 Registration, Admission and Status (RAS) protocol that defines how H.323 entities can access H.323 gatekeepers to perform, among other things, address translation, thereby allowing H.323 endpoints to locate other H.323 endpoints via an H.323 gatekeeper. The H.225.0 layer 82, which is derived from the Q.931 layer 91, is the protocol for establishing a connection among two or more terminals and also formats the transmitted video, audio, data, signaling, and control streams into messages for communication via the network interface 71 (e.g., packet network 101). The H.225.0 layer 82 also retrieves the received video, audio, data, signaling and control streams from messages that have been input from the network interface, routes the signaling and control information to the control layer 111 and routes media streams to the appropriate audio, video and data interfaces.

Thus, an H.323 network may be configured to include several different devices. For example, the network may include a terminal for enabling a user connected to a LAN to communicate with another user on the LAN, a terminal for enabling a caller resident on the LAN to call a second party in the public switched network and/or a terminal for enabling an adapter to communicate through a wireless trunk, using a wireless telephone. The device may also implement supplementary services according to the H.450.X Recommendations.

Figure 5:
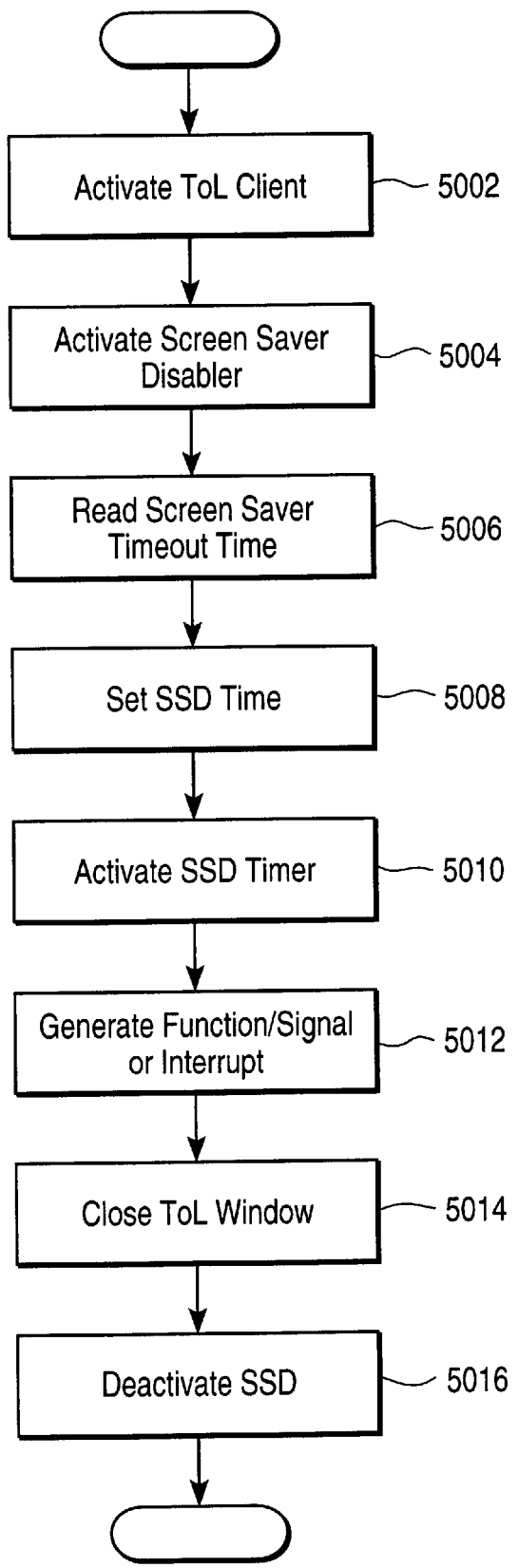
FIG. 5 is a flowchart illustrating operation of an embodiment of the invention.

According to one embodiment of the invention, a screen saver disabler 56 is configured to activate upon activation of the ToL client window 3008, and deactivate when the ToL client window 3008 is closed. Operation of this embodiment is illustrated in greater detail in FIG. 5. In particular, in a step 5002, the user activates the ToL client window 3008, for example, by clicking on an appropriate icon (not shown) in a known manner. The ToL application program 52 and the operating system 50 then generate a ToL application window on the GUI screen 160. In response, in a step 5004, the screen saver disabler 56 is activated. Next, in a step 5006, the screen saver disabler 56 reads the Activation Time of the screen saver 54, as well as the time remaining on the screen saver's associated timer or counter. In a step 5008, the screen saver disabler 56 sets its own timer, to a predetermined time before expiration of the screen saver timer. In a step 5010 the screen saver disabler timer is activated and begins its countdown. Upon expiration of the screen saver disabler's timer, in a step 5012, the screen saver disabler executes a predetermined function which is interpretable by the screen saver 54 as indicating some user activity. The screen saver timer then resets.

As noted above, and as will be discussed in greater detail below, the predetermined function may include the generation of an interrupt received at the microprocessor 22 indicative of a mouse movement or click, or of a keyboard keystroke or sequence of keystrokes. In such a case, to prevent an unintended action from being undertaken in response to the keyboard or mouse interrupt, an interrupt routine may be provided wherein the "dummy" software interrupt is interpreted as taking an action and then undoing it. For example, the action might be the movement of the mouse cursor a predetermined number of pixels and then back again. Similarly, the action might be space, space, backspace, backspace.

Alternatively, the expiration of the screen saver disabler's timer may cause a disk drive access and particularly, a write, store and erase function to be executed. More particularly, the expiration of the timer may cause the screen saver disabler 56 to write a zero (0), for example, to a file and store it on the hard disk drive 26, and then delete the file.

Next, in a step 5014, the user may close the ToL window or otherwise exit the program. Then in a step 5016, the screen saver disabler 56 similarly closes. Because the screen saver 54 itself has not been shut down, the user need not reset the screen saver to an active state. It is noted that the above-identified process may be executed with reference to the power-down system 33 which typically enters a power down mode responsive to an absence of predetermined activity, such as interrupts, for a predetermined period.

As discussed above, in various embodiments of the present invention, the screen saver disabler 56 monitors the ToL Client Application program and determines when a call setup command is issued. At that time, the screen saver disabler 54 activates. The screen saver disabler 56 deactivates when the call terminates. The screen saver disabler is configured to do so in each of the H.323 modes: gatekeeper routing for call control and signaling, direct-routing for call control and call signaling, and gatekeeper routed call signaling, but direct routing for call control. These are illustrated with reference to FIGS. 6A–6C. It is noted that while described primarily with respect to a screen saver, the invention is equally applicable to a power-down disabler function.

Figure 6A:
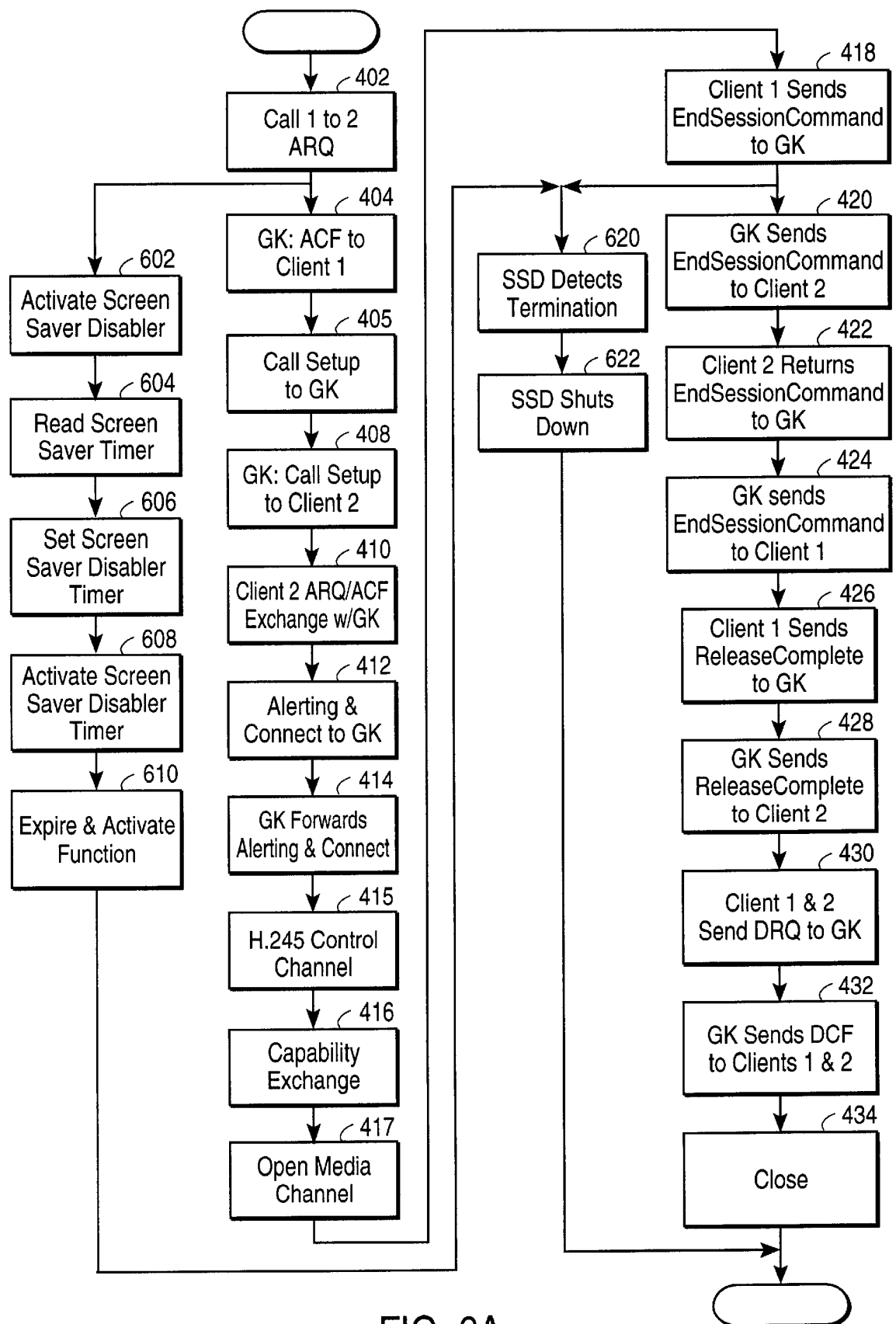
FIGS. 6A–6C illustrate operation of other embodiments of the invention.

In particular, FIG. 6A illustrates the embodiment of the invention using gatekeeper routed call and control signaling. In particular, in a step 402, a ToL endpoint Client 1 (e.g., client terminal 102a) wants to establish a call to another endpoint, Client 2 (e.g., client terminal 102b). The endpoint Client 1 and, particularly, the control unit 111, sends an ARQ message (AdmissionRequest) to the gatekeeper GK. Assuming the gatekeeper GK is functioning, the gatekeeper GK responds with an ACF (AdmissionConfirm) message to Client 1, in a step 404, which is received by the controller 111. The ACF message includes a Call Signaling Transport Channel Address of the gatekeeper GK. In a step 406, in response to the ACF message, the controller 111 sends to gatekeeper GK an H.225.0 set-up message including a Globally Unique Call Identifier to identify the call.

In a step 408, the gatekeeper GK relays the H.225.0 set-up message to the endpoint Client 2 and, in particular, its control unit 111. In response, in a step 410, the endpoint Client 2's control unit 111 conducts an ARQ/ACF exchange with the gatekeeper GK. In a step 412, the endpoint Client 2's control unit 111 sends H.225.0 Alerting and Connect messages to the gatekeeper GK as the call progresses to the connect state. The gatekeeper GK, in turn provides the Alerting and Connect messages to the endpoint Client 1's control unit in a step 414. The Alerting or Connect message includes the Gatekeeper H.245 Control Channel Transport Address, which is used, in a step 415, to establish the H.245 control channel. Next, an H.245 capability exchange is undertaken, in a step 416. The capability exchange includes exchanges of the coding algorithm to be used, and the like. In a step 417 the media channel is opened between endpoint Client 1 and Client 2.

In parallel, the screen saver disabler 56 is activated, in a step 602, some time after step 402. For example, the screen saver disabler 56 might detect the issuance of the ARQ in step 402, the reception of the ACF in step 404, or the issuance of the call setup command in step 406. Next, in a step 604, the screen saver disabler reads the screen saver timer for its preset time and its current time. In a step 606, the screen saver disabler 56 sets its own timer (not shown), to a predetermined time before expiration of the screen saver timer. In a step 608 the screen saver disabler timer is activated and begins its countdown. Upon expiration of the screen saver disabler's timer, in a step 610, the screen saver executes a predetermined function which is interpretable by the screen saver 54 (or a power control unit) as indicating some user activity, as will be discussed in greater detail below. The screen saver timer then resets and the process continues as before.

Then, call termination is initiated by the user of endpoint Client 1. In a step 418, the endpoint Client 1, for example, initiates call termination by sending an H.245 endSessionCommand to gatekeeper GK. The gatekeeper GK, in a step 420, sends the H.245 endSessionCommand on to endpoint Client 2. It is noted that the call termination could be initiated from the endpoint Client 2 as well. In a step 422, endpoint Client 2 responds to the received H.245 endSessionCommand by sending its own H.245 endSessionCommand to the gatekeeper GK. The gatekeeper GK, in a step 424, sends the H.245 endSessionCommand on to endpoint Client 1. In a step 426, endpoint Client 1 sends an H.225.0 Release Complete message to gatekeeper GK to close the call signaling channel. The gatekeeper GK, in a step 428, sends the Release Complete message on to endpoint Client 2. The endpoint Clients 1 and 2 then inform the gatekeeper GK to release the bandwidth for the primary call by sending Disengage Request (DRQ) messages to the gatekeeper GK, in a step 430. In a step 432, the gatekeeper GK responds to the received DRQ messages by sending endpoint Clients 1 and 2 Disengage Confirm (DCF) messages. In a step 434, the media connection and signaling connections are closed.

In parallel, some time after step 418, the screen saver disabler 56 detects that the communication is being closed or terminated, in a step 620. For example, the screen saver disabler may detect the issuance of the EndSessionCommand of step 418, or even the DCF message of step 432. Next, in a step 622, the screen saver disabler shuts down. The screen saver disabler 56 may shut down at any time during the call termination process, but preferably after the actual connections are closed. If the screen saver disabler 56 deactivates prior to the actual closing of the connections, it is preferred that it should do so only after it is determined that the screen saver 54 itself will not activate prior to the actual closing of the connections.

Figure 6B:
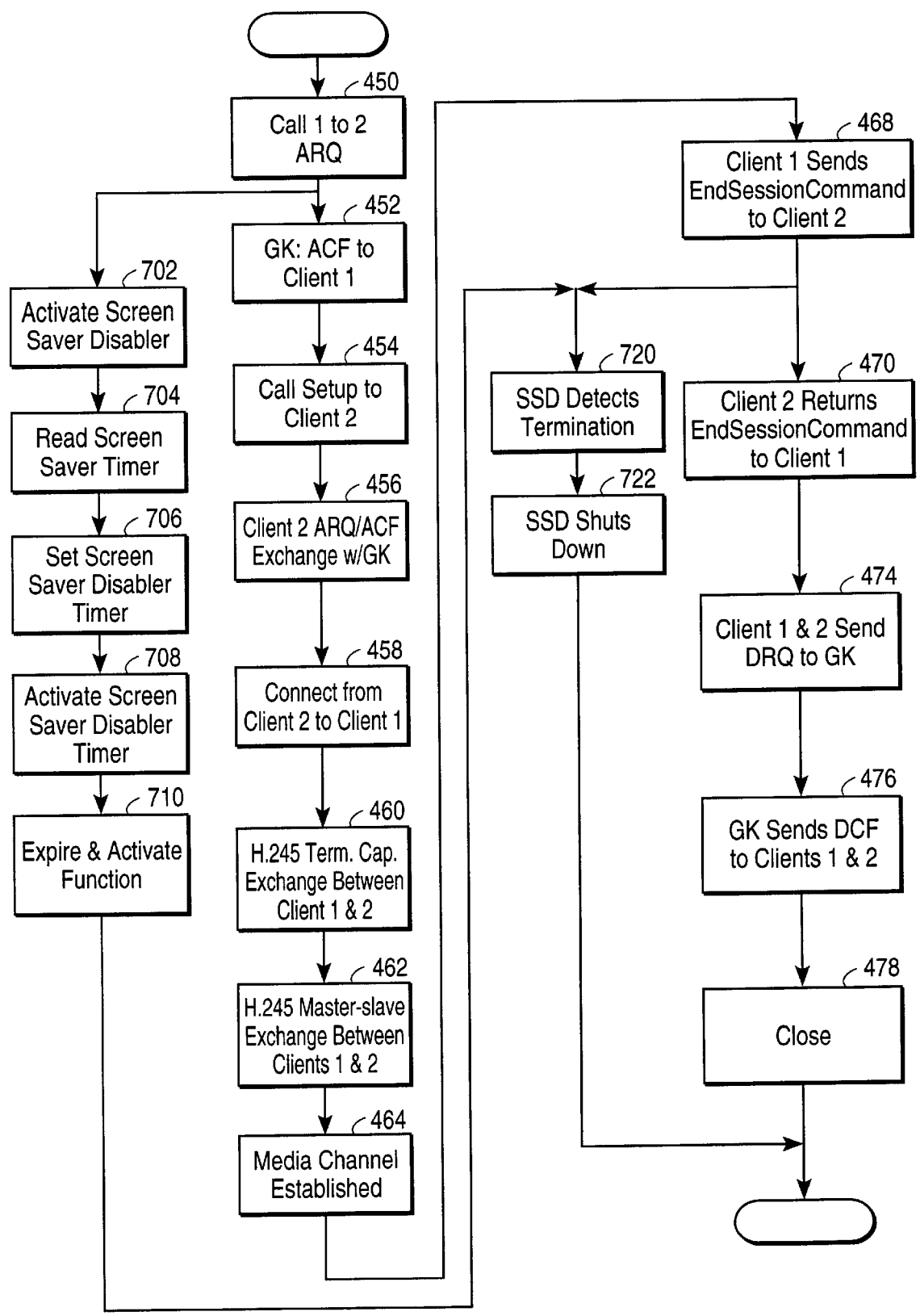

An alternate embodiment of the invention is shown in FIG. 6B. In particular, in a step 450, the control unit 111 of Client 1 sends an ARQ message to the gatekeeper GK requesting that a call to endpoint Client 2 be allowed using a direct call model. In a step 452, the gatekeeper GK responds with an ACF message to the endpoint Client 1. The ACF message includes a Call Signaling Transport Channel Address of the endpoint Client 2. In a step 454, in response to the ACF message, the control unit 111 sends an H.225.0 Setup message directly to endpoint Client 2. In response to the setup message, in a step 456, the endpoint Client 2's control unit 111 conducts an ARQ/ACF exchange with the gatekeeper GK. Next, in a step 458, the endpoint Client 2's control unit sends an H.225.0 Connect message to the endpoint Client 1's control unit to progress the secondary call to a connect state. In a step 460, the endpoint Clients 1 and 2 exchange H.245 terminal capability messages. In a step 462, the endpoints Client 1 and Client 2 exchange H.245 master-slave determination messages and any other needed H.245 messages. Finally, in a step 464, the media channel between the endpoints is established.

In parallel, the screen saver disabler 56 is activated, in a step 702, some time after step 450. For example, the screen saver disabler 56 might detect the issuance of the ARQ in step 450, the reception of the ACF in step 452, or the issuance of the call setup command in step 454. Next, in a step 704, the screen saver disabler reads the screen saver timer for its preset time and its current time. In a step 706, the screen saver disabler 56 sets its own timer, to a predetermined time before expiration of the screen saver timer. In a step 708 the screen saver disabler timer is activated and begins its countdown. Upon expiration of the screen saver disabler's timer, in a step 710, the screen saver executes a predetermined function which is interpretable by the screen saver 54 as indicating some user activity, as will be discussed in greater detail below. The screen saver timer then resets and the process continues as before.

Then, call termination is initiated by the user of endpoint Client 1. In a step 468, the endpoint Client 1, for example, initiates call termination by sending an H.245 endSessionCommand to Client 2. In a step 470, endpoint Client 2 responds to the received H.245 endSessionCommand by sending its own H.245 endSessionCommand to the endpoint Client 1. In a step 472, endpoint Client 1 sends an H.225.0 Release Complete message to the Client 2 to close the call signaling channel. The endpoint Clients 1 and 2 then inform the gatekeeper GK to release the bandwidth for the call by sending Disengage Request (DRQ) messages to the gatekeeper GK, in a step 474. In a step 476, the gatekeeper GK responds to the received DRQ messages by sending endpoint Clients 1 and 2 Disengage Confirm (DCF) messages. In a step 478, the media connection and signaling connections are closed.

In parallel, some time after step 468, the screen saver disabler detects that the communication is being closed or terminated, in a step 720. For example, the screen saver disabler may detect the issuance of the EndSessionCommand of step 468, or even the DCF message of step 476. Next, in a step 722, the screen saver disabler 56 shuts down. The screen saver disabler may shut down at any time during the call termination process, but preferably after the actual connections are closed. If the screen saver disabler deactivates prior to the actual closing of the connections, it is preferred that it should do so only after it is determined that the screen saver itself will not activate prior to the actual closing of the connections.

Figure 6C:
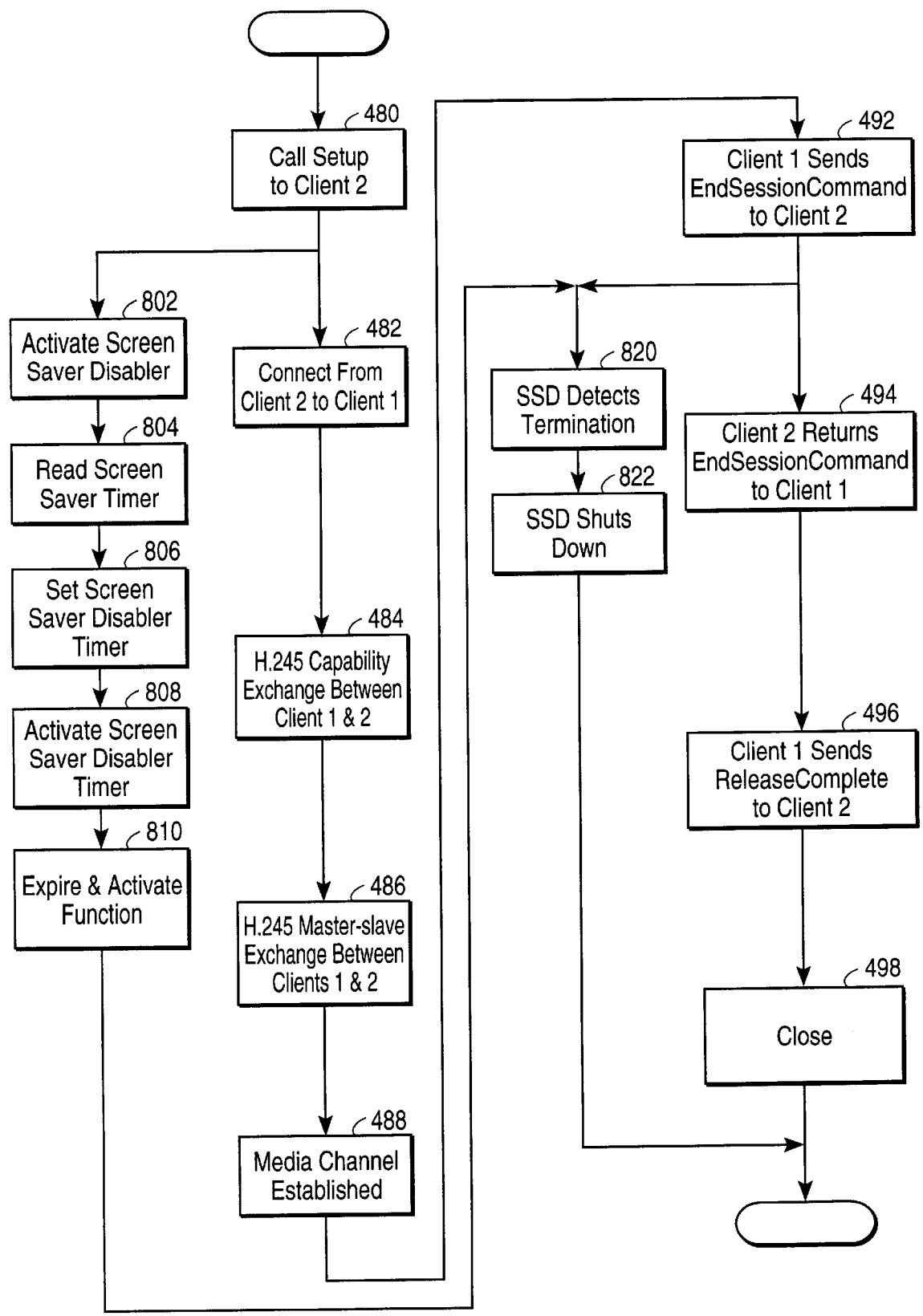

Another alternate embodiment of the invention is shown in FIG. 6C. In particular, in a step 480, the control unit 111 of Client 1 sends an H.225.0 Setup message directly to endpoint Client 2. In response to the setup message, in a step 482, the endpoint Client 2's control unit sends an H.225.0 Connect message to the endpoint Client 1's control unit to progress the secondary call to a connect state. In a step 484, the endpoint Clients 1 and 2 exchange H.245 terminal capability messages. In a step 486, the endpoints Client 1 and Client 2 exchange H.245 master-slave determination messages and any other needed H.245 messages. Finally, in a step 488, the media channel between the endpoints is established.

In parallel, the screen saver disabler 56 is activated, in a step 802, some time after step 480. Next, in a step 804, the screen saver disabler reads the screen saver timer for its preset time and its current time. In a step 806, the screen saver disabler 56 sets its own timer, to a predetermined time before expiration of the screen saver timer. In a step 808 the screen saver disabler timer is activated and begins its countdown. Upon expiration of the screen saver disabler's timer, in a step 810, the screen saver executes a predetermined function which is interpretable by the screen saver 54 as indicating some user activity, as will be discussed in greater detail below. The screen saver timer then resets and the process continues as before.

Then, call termination is initiated by the user of endpoint Client 1. In a step 492, the endpoint Client 1, for example, initiates call termination by sending an H.245 endSessionCommand to Client 2. In a step 494, endpoint Client 2 responds to the received H.245 endSessionCommand by sending its own H.245 endSessionCommand to the endpoint Client 1. In a step 496, endpoint Client 1 sends an H.225.0 Release Complete message to the Client 2 to close the call signaling channel. In a step 498, the media connection and signaling connections are closed.

In parallel, some time after step 492, the screen saver disabler detects that the communication is being closed or terminated, in a step 820. For example, the screen saver disabler may detect the issuance of the EndSessionCommand of step 492. Next, in a step 822, the screen saver disabler shuts down. The screen saver disabler may shut down at any time during the call termination process, but preferably after the actual connections are closed. If the screen saver disabler deactivates prior to the actual closing of the connections, it is preferred that it should do so only after it is determined that the screen saver itself will not activate prior to the actual closing of the connections.

Figure 7A:
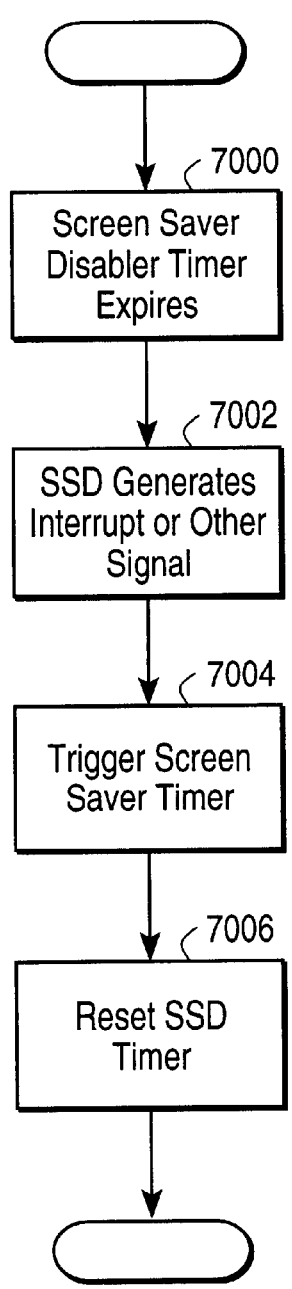
FIG. 7A and 7B illustrate operation of another embodiment of the invention.

As noted above, a variety of functions may be performed to cause the screen saver timer or power mode timer to reset. Turning now to FIG. 7A, a diagram illustrating the function assertion procedure according to one embodiment of the present invention is shown. In particular, in a step 7000, the screen saver disabler's timer expires. In a step 7002, the screen saver disabler 56 asserts an interrupt or other signal indicative of a signal or other activity which would activate the screen saver's timer. For example, the signal might be representative of a keystroke or a series of keyboard keystrokes, such as "space, back space" or (left cursor right cursor). Alternatively, the signal might be indicative of a mouse cursor movement or mouse button click or input. In response, in a step 7004, the screen saver timer is triggered. Then, in a step 7006, when the screen saver timer (or the power down unit's timer) is reset, so is the screen saver disabler's timer.

Figure 7B:
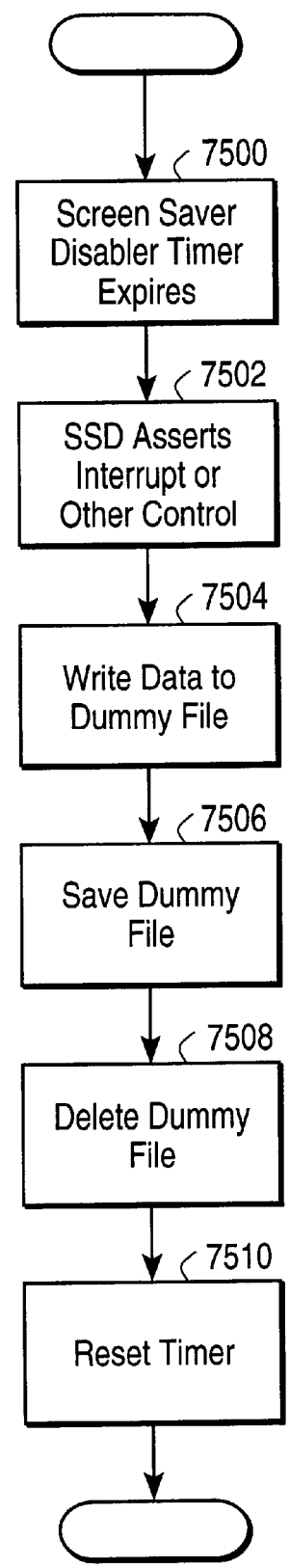

Similarly, FIG. 7B illustrates an alternate function for triggering the screen saver timer or for triggering a power save timer. In particular, in a step 7500, the screen saver timer expires. In a step 7502, the screen saver disabler 56 asserts an interrupt to cause a function which would activate a power down timer. For example, in a step 7504, the interrupt may include a routine which causes a drive access, such as a write to a file. In a step 7506, the file is saved and, in a step 7508, the file is deleted so as not to waste disk space. Finally, in a step 7508, the timer is reset.

What is claimed is:

1. A system for operating a telephony-over-LAN (ToL) client terminal, comprising:
    a graphical user interface supporting a ToL client window and a screen saver, said screen saver configured to activate upon detecting an absence of predetermined activity for a predetermined time;
    means for executing a ToL call between said ToL client terminal and another telephony device; and
    means for automatically generating said predetermined activity during execution of said call to prevent activation of said screen saver.

2. A system according to claim 1, said generating means including means for determining said predetermined time and generating said predetermined activity a predetermined period prior to an expiration of said predetermined time.

3. A system according to claim 2, said generating means including means for generating an interrupt.

4. A system according to claim 3, said interrupt comprising a keyboard interrupt.

5. A system according to claim 3, said interrupt comprising a mouse interrupt.

6. A system according to claim 2, said generating means comprising means for saving a file to a storage device.

7. A system according to claim 1, said generating means including means for reading said predetermined time upon an opening of said ToL client window.

8. A system according to claim 7, said generating means configured to deactivate upon a closing of said ToL client window.

9. A system according to claim 1, said generating means including means for determining said predetermined time responsive to one or more signals indicative of a call setup.

10. A system according to claim 9, said generating means including means for deactivating responsive to one or more signals indicative of a call termination.

11. A method for operating a telephony-over-LAN (ToL) client terminal, comprising:
    providing a graphical user interface;
    providing a screen saver, said screen saver configured to activate upon detecting an absence of predetermined activity for a predetermined period;
    generating a ToL client window;
    executing a ToL call between said ToL client terminal and another telephony device; and
    automatically generating said predetermined activity during execution of said call to prevent activation of said screen saver.

12. A method according to claim 11, said generating including determining said predetermined time and generating said predetermined activity a predetermined period prior to an expiration of said predetermined time.

13. A method according to claim 12, said generating including generating an interrupt.

14. A method according to claim 13, said interrupt comprising a keyboard interrupt.

15. A method according to claim 13, said interrupt comprising a mouse interrupt.

16. A method according to claim 12, said generating including saving a file to a storage device.

17. A method according to claim 11, said generating including reading said predetermined time upon an opening of said ToL client window.

18. A method according to claim 17, said generating including deactivating upon a closing of said ToL client window.

19. A method according to claim 11, said generating including determining said predetermined time responsive to one or more signals indicative of a call setup.

20. A method according to claim 19, said generating including deactivating responsive to one or more signals indicative of a call termination.

21. A client terminal, comprising:

a graphical user interface supporting one or more client windows and a screen saver, said screen saver configured to activate upon detecting an absence of predetermined activity for a predetermined time; and a processor programmed to automatically generate one or more signals indicative of said predetermined activity to prevent activation of said screen saver.

22. A client terminal according to claim 21, including a power management system, said power management system configured to enter a power down mode upon detecting an absence of predetermined activity for a predetermined time.

23. A client terminal according to claim 22, said processor programmed to automatically generate one or more signals indicative of said predetermined activity to prevent activation of said power down mode.

24. A client terminal according to claim 21, said processor programmed to generate said one or more signals responsive to detection of one or more communications between said client terminal and another device.

25. A client terminal according to claim 24, said one or more signals indicative of a storage device access.

26. A client terminal according to claim 24, said one or more signals indicative of a keyboard input.

27. A client terminal according to claim 24, said one or more signals indicative of a mouse input.

28. A client terminal, compromising:

a graphical user interface;

a power management system configured to cause entry into a power down mode upon detecting an absence of a predetermined activity for a predetermined time; and a processor programmed to automatically generate one or more signals indicative of said predetermined activity to prevent activation of said power management system.

* * * * *